United States Patent [19]

Miyazawa

[11] Patent Number: 5,669,657
[45] Date of Patent: Sep. 23, 1997

[54] SUNROOF ASSEMBLY FOR MOTOR VEHICLE

[75] Inventor: Kiyotaka Miyazawa, Atsugi, Japan

[73] Assignee: Hori Glass Co., Ltd., Japan

[21] Appl. No.: 571,116

[22] Filed: Dec. 12, 1995

[30] Foreign Application Priority Data

Dec. 13, 1994 [JP] Japan ................... 6-332732
Dec. 13, 1994 [JP] Japan ................... 6-332733

[51] Int. Cl.$^6$ ........................................... B60J 7/00
[52] U.S. Cl. ........................... 296/216; 49/490.1
[58] Field of Search ............... 296/216; 49/490.1, 49/492.1, 501

[56] References Cited

U.S. PATENT DOCUMENTS

| | | | |
|---|---|---|---|
| 4,765,677 | 8/1988 | Nagata | 49/490.1 X |
| 4,775,570 | 10/1988 | Ohlenforst et al. | 49/490.1 |
| 5,042,873 | 8/1991 | Yagami | 296/216 X |
| 5,170,587 | 12/1992 | Nakatani et al. | 296/216 X |
| 5,466,508 | 11/1995 | Brocke et al. | 296/216 X |
| 5,524,955 | 6/1996 | Brocke et al. | 296/216 |

FOREIGN PATENT DOCUMENTS

| | | | |
|---|---|---|---|
| 128022 | 7/1985 | Japan | 296/216 |
| 6-16628 | 6/1994 | Japan | |
| 556962 | 5/1977 | U.S.S.R. | 49/490.1 |

*Primary Examiner*—Dennis H. Pedder
*Attorney, Agent, or Firm*—Adams & Wilks

[57] ABSTRACT

A sunroof assembly comprises a transparent member having first and second peripheral edge portions. A first supporting member is connected to the first peripheral edge portion of the transparent member. The first supporting member has a first ridge portion defining a supporting edge disposed on the first peripheral edge portion of the transparent member, a second ridge portion, and a groove disposed between the first and second ridge portions. A second supporting member is connected to the second peripheral edge portion of the transparent member. The second supporting member has a recessed portion, a first flange portion extending generally perpendicular to the recessed portion, and a second flange portion disposed in the groove of the first supporting member and extending generally perpendicular to the first flange portion.

18 Claims, 3 Drawing Sheets

SUNROOF ASSEMBLY FOR MOTOR VEHICLE

FIELD OF THE INVENTION

The present invention relates to sunroof assemblies for motor vehicles. More particularly, the present invention relates to a sunroof assembly for motor vehicles with improvements in attachment to a retainer, a weatherstrip, and a holder.

DESCRIPTION OF THE PRIOR ART

A sunroof assembly for motor vehicles that can hold a holder and a retainer in a prescribed positional relation is disclosed in Japanese Patent Application Laid-Open Publication No. 6-166328 assigned to the same assignee as that of the present application. Referring to FIG. 4, the sunroof assembly for motor vehicles in the Japanese Patent Application comprises a sunroof glass 41 made of a transparent member, a generally T-shaped holder 44 arranged on the surface of the outer edge of the sunroof glass 41, a holder fixing part 49 having an opening part 48 into which a center projection 47 of the generally T-shaped holder 44 can be inserted, a retainer 42 arranged on the undersurface of the outer edge of the window part, a joint area 50 for the retainer 42 that is formed by making the back surface of the holder fixing part 49 generally flat, a positioning abutment part 52 in contact with the inside of a flange 51 provided at one end of the retainer 42, and a stopper 43 positioned between the holder 44 and the retainer 42, the stopper 43 having a lower bulge part 46 of the retainer 42 and a spacer part 53 for keeping a certain space for the position of the surface direction of the sunroof glass 41, and the lower bulge part 46 and the spacer part 53 being paired. In this sunroof assembly for motor vehicles, since the holder 44 and the retainer 42 can be held in a prescribed positional relation by adding the stopper 43, the position of the holder 44 can be prevented from being displaced during or after assembly of the sunroof assembly, and the possibility that the weather strip 45 may come out accidentally can be prevented.

However, in the foregoing sunroof assembly method for motor vehicles, the sunroof glass 41 and the rigid resin holder 44 are placed on the retainer 42 from above, the weather strip 45 is inserted into the flange part of the holder 44 and the retainer 42, and thereafter the holder 44 and the retainer 42 are fixed by a jig. In this case, if some failure or damage occurs after the insertion of the weather strip 45, it is impossible to replace only the particular damaged part, and all the parts have to be replaced. Further, the surface of the holder 44 is easily scarred and even when a failure in bonding to the sunroof glass 41 occurs, it is impossible to replace the particular damaged part, and all the parts have to be replaced.

SUMMARY OF THE INVENTION

An object of the present invention is to provide a sunroof assembly for motor vehicles wherein if some failure or damage occurs to the weather strip or the holder, only the particular damaged part can be replaced.

According to a first embodiment, the sunroof assembly of the present invention comprises a sunroof glass for motor vehicles, a retainer provided below the surface of the sunroof glass, and a weather strip connected to the retainer. The retainer has a recess part in which a bonding agent for bonding the sunroof glass is placed, a generally vertical stopper part provided outside of the recess part, a generally horizontal holder part that is provided to extend outward from the upper end of the stopper part, and projections provided on the holder part with a prescribed interval between the projections. The weather strip is comprised of a stopper surface for abutting on the stopper part of the retainer, a holder groove to be fitted to the holder part, an anchor groove formed in the holder groove for engaging with the projections, and a lip part for holding the sunroof glass. The sunroof glass is placed in the recess part of the retainer, then while the sunroof glass is held by the lip part of the weather strip, the holder part of the retainer is inserted into the holder groove, the stopper surface is abutted on the stopper part of the retainer, and the anchor groove is engaged with the projections, so that the sunroof glass, the retainer, and the weather strip are connected together integrally.

According to a second embodiment, the sunroof assembly comprises a sunroof glass for motor vehicles, a retainer provided below the surface of the sunroof glass, and a weather strip connected to the retainer. The retainer has a recess part in which a bonding agent for bonding the sunroof glass is placed, a generally horizontal island provided outside of the recess, and a generally vertical flange part provided outside of the island. The weather strip has a positioning bottom surface for abutting on the island of the retainer, a flange groove to be fitted to the flange part, and a lip part for holding the sunroof glass. When the recess of the retainer is filled with the bonding agent, the sunroof glass is placed thereon, the island part is filled with the bonding agent, and the bottom surface of the weather strip is abutted and bonded onto the island of the retainer, the sunroof glass, the retainer, and the weather strip are connected together integrally.

By the foregoing construction, when the retainer is attached to a lid sunroof, it becomes possible to attach the weather strip at a later time in the final step. Further, even when only the weather strip happens to fail or become damaged, since the retainer and the weather strip are not bonded, they can be replaced subsequently. Further, even after the lid sunroof is attached to a motor vehicle, and when some failure occurs, the weather strip alone can be replaced.

In the case wherein sunroof glasses have the same shape but different curvatures, by making the absorption amount of the weather strip large, any of the sunroof glasses having different curvatures can be used. Further, since the scattering of the accuracy of the surface of the sunroof glass can be absorbed, the sunroof assembly for motor vehicles itself can be improved in quality.

Further, on account of the simple structure wherein the weather strip is only inserted into the retainer, any bonding agent between the weather strip and the sunroof glass can be omitted, so that the cost can be reduced considerably. Further, by omission of the bonding agent to the weather strip, a finishing operation for removing an excess bonding agent is not required, and therefore such an effect can be secured that due to the resulting reduction in the number of steps the cost can be reduced.

DETAILED DESCRIPTION OF THE PREFERRED EMBODIMENTS

Figure 1:
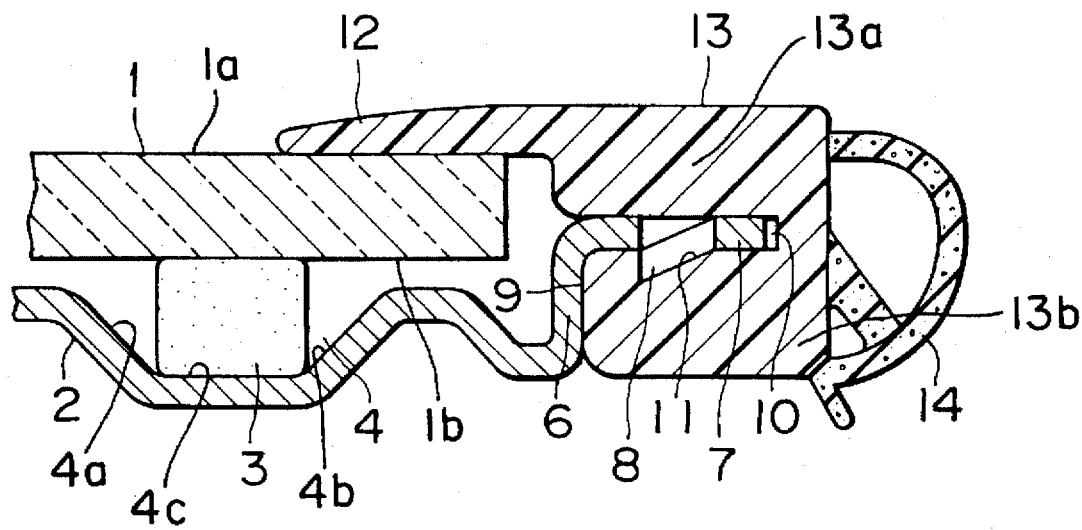
FIG. 1 is a cross section of the sunroof assembly for motor vehicles according to a first embodiment of the present invention.
Figure 5:
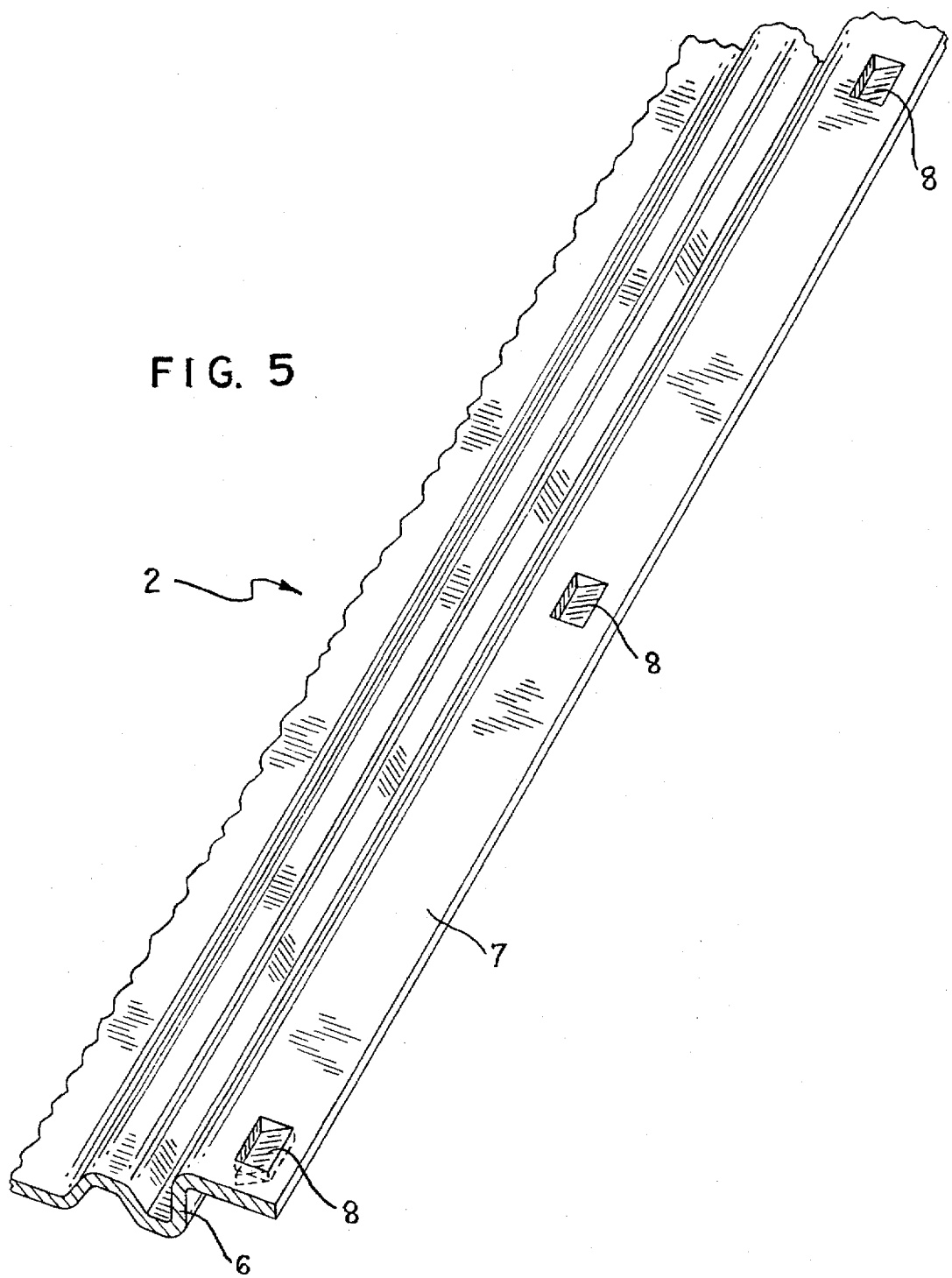
FIG. 5 is a segmentary view in perspective and partly in section of the retainer for the sunroof assembly according to the first embodiment of the present invention.

Referring to FIGS. 1 and 5, the sunroof assembly for motor vehicles according to a first embodiment of the present invention is now described.

Reference numeral 1 indicates a transparent member, such as a sunroof glass, of motor vehicles or the like. The sunroof glass 1 has first and second peripheral edge portions 1a, 1b and is usually made of toughened glass, measures approximately 42 cm long and 93 cm wide, and is placed in the roof of motor vehicles or the like. A supporting member comprised of a retainer 2 made of metal is disposed below the sunroof glass 1. The retainer 2 made of metal is a little larger than the sunroof glass 1 and is a press-molded frame about 6 cm wide. The retainer 2 is composed of a recess part 4, defined by a pair of sidewall portions 4a, 4b and a base portion 4c, which is filled with a bonding agent 3, a vertical flange portion or stopper part 6 that extends generally perpendicular to the base portion of the recess part 4, and a generally horizontal flange portion or holder part 7 that extends outward at a right angle from the upper end of the stopper part 6. The holder part 7 is provided with projections 8 with a prescribed interval between them that are formed by curling. A supporting member comprised of a weather strip 13 made of solid rubber is fitted to the retainer 2 to hold the sunroof glass 1 at the first peripheral edge portion 1a. The weather strip 13 has a first ridge portion 13a, a second ridge portion 13b, a stopper surface 9 abutting on the stopper part 6 of the retainer 2, a holder groove 10 fitted to the holder part 7 and disposed between the first and second ridge portions 13a, 13b, a notch or anchor groove 11 that is formed in the holder groove 10 and is engaged with the projections 8, a peripheral edge portion or lip part 12 for supporting the sunroof glass 1, and a sponge rubber part 14.

The bonding agent 3 is placed in the recess part 4 of the retainer 2 and the sunroof glass 1 is placed thereon. While the sunroof glass 1 is held by the lip part 12 of the weather strip 13, the holder part 7 of the retainer 2 is inserted into the holder groove 10. Further, the stopper surface 9 is abutted against the stopper part 6 and the anchor groove 11 is engaged with the projections 8. Thus, the sunroof glass 1, the retainer 2, and the weather strip 13 are connected together integrally.

By this construction, when the retainer is attached to a lid sunroof, it becomes possible to attach the weather strip at a later time in the final step. Accordingly, since the retainer and the weather strip are not bonded, they can be replaced subsequently. Further, even after the lid sunroof is attached to a motor vehicle, and when some failure occurs, only the weather strip can be replaced. Further, because of the structure wherein the weather strip is simply fitted to the retainer, any bonding agent between the weather strip and the sunroof glass can be omitted.

Figure 2:
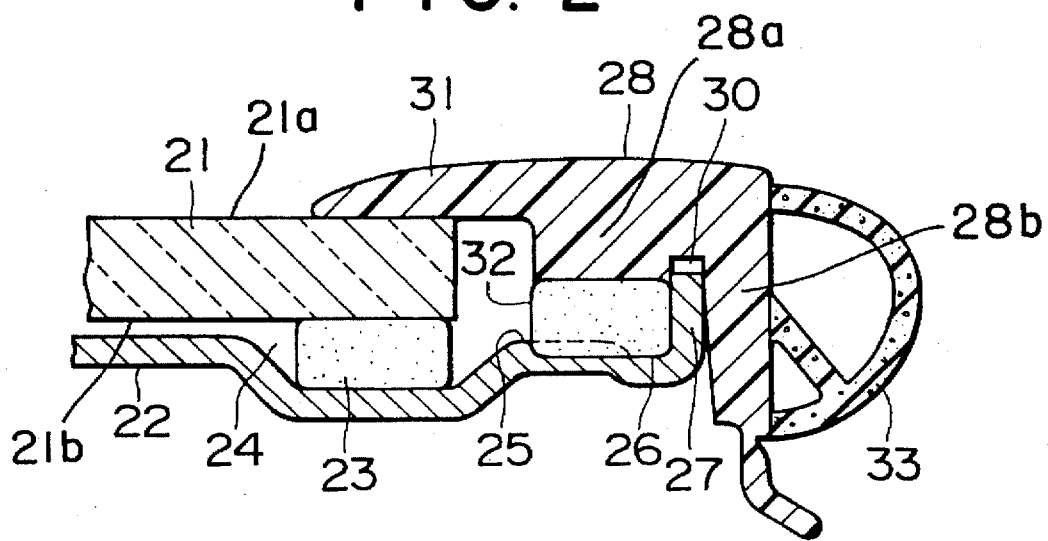
FIG. 2 is a cross section of the sunroof assembly for motor vehicles according to a second embodiment of the present invention.
Figure 3:
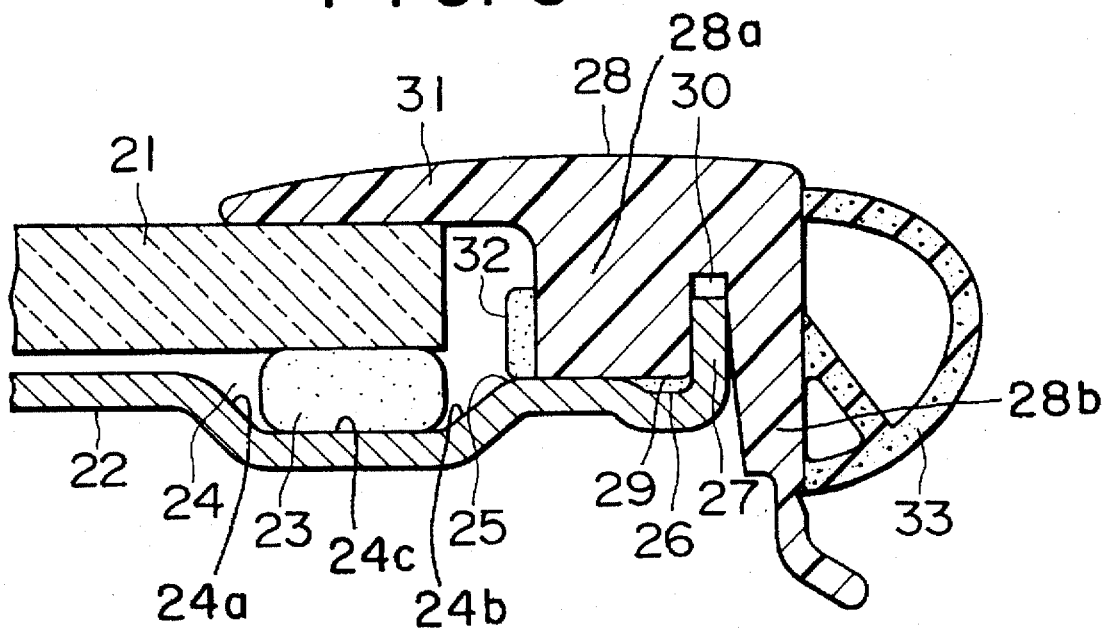
FIG. 3 is a cross section of the sunroof assembly for motor vehicles according to a second embodiment of the present invention wherein the sunroof glass, a retainer, and a weather strip are integrated.
Figure 4:
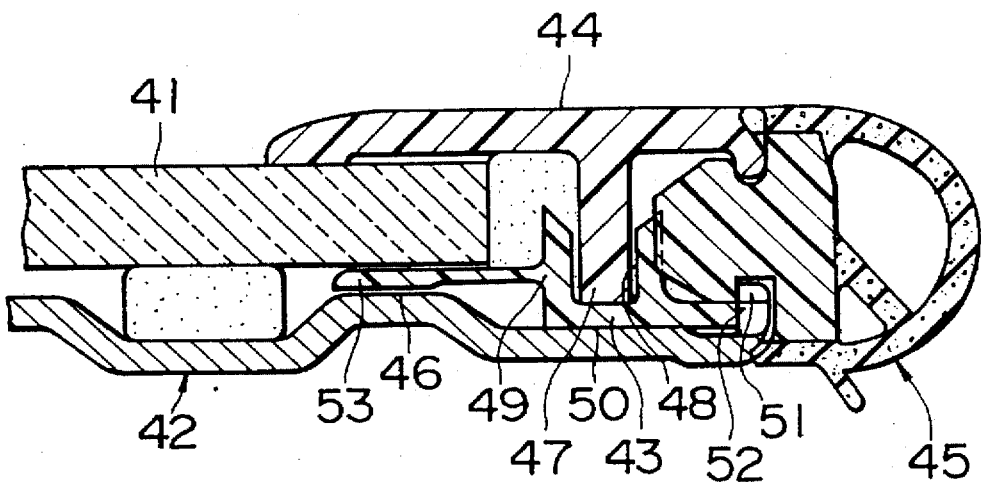
FIG. 4 is a cross section of a conventional sunroof assembly for motor vehicles.

Referring now to FIGS. 2 and 3, the sunroof assembly for motor vehicles according to a second embodiment of the present invention will be described. A transparent member or sunroof glass 21 has first and second peripheral edge portions 21a, 21b. A supporting member or retainer 22 has a recess part 24, defined by a pair of sidewalls 24a, 24b and a base portion 24c, in which a bonding agent 23 for bonding the sunroof glass 21 is placed. A generally horizontal island part or raised portion 25 is formed outside of the recess part 24, a cavity or groove 26 is formed outside of the island 25, and a flange part 27 is bent generally perpendicularly upward from the outside of the groove 26. A supporting member, such as a weather strip 28 made of solid rubber, is fitted to the retainer 22 to hold the sunroof glass 21. The weather strip 28 has a positioning bottom surface 29 abutted on the island part 25 of the retainer 22, a flange groove 30 fitted to the flange part 27, a support portion or lip part 31 for holding the sunroof glass 21 at the first peripheral edge portion 21a thereof, first and second ridge portions 28a, 28b extending from the lip part 31, and a sponge part 33.

The recess part 24 and the groove 26 of the retainer 22 are filled with bonding agents 23, 32, respectively, and the sunroof glass 21 is placed thereon. Thereupon, while the sunroof glass 21 is held by the lip part 31 of the weather strip 28, the flange part 27 of the retainer 22 is inserted into the flange groove 30. Further, upon abutting and bonding the bottom surface 29 to the island part 25, the sunroof glass 21, the retainer 22, and the weather strip 28 are connected together integrally as shown in FIG. 3. The construction of the sunroof assembly according to the second embodiment has an effect similar to that of the first embodiment.

What is claimed is:

1. A sunroof assembly for motor vehicles, comprising: a sunroof glass; a retainer disposed below a surface of the sunroof glass, the retainer having a recess part defined by a pair of sidewall portions and a base portion, a stopper part extending generally perpendicular to the base portion of the recess part, a generally horizontal holder part extending from an upper end of the stopper part, and projections provided on the holder part with a prescribed interval between the projections; a bonding agent disposed in the recess part of the retainer; and a weather strip for connection to the retainer, the weather strip having a stopper surface for abutment with the stopper part of the retainer, a holder groove for receiving the holder part, an anchor groove formed in the holder groove for engagement with the projections of the holder part of the retainer, and a lip part for supporting the sunroof glass; wherein the sunroof glass is disposed on the retainer with the bonding agent disposed in the recess part of the retainer, the holder part of the retainer is inserted into the holder groove while the sunroof glass is supported by the lip part of the retainer, the stopper surface is abutted on the stopper part, and the anchor groove is engaged with the projections to thereby integrally connect the sunroof glass, the retainer, and the weather strip together.

2. A sunroof assembly for motor vehicles, comprising: a sunroof glass; a retainer disposed below a surface of the sunroof glass, the retainer having a recess part defined by a pair of side portions and a base portion, a generally horizontal raised part disposed outside of the recess part, and a generally vertical flange part provided outside of the raised part; a bonding agent disposed in the recessed part of the retainer; and a weather strip for connection to the retainer, the weather strip having a positioning bottom surface for abutment with the raise part of the retainer, a flange groove for receiving the flange part, and a lip part for supporting the sunroof glass; wherein the recess part of the retainer is provided with the bonding agent, the sunroof glass is disposed on the retainer the, raised part is provided the bonding agent, and the bottom surface of the weather strip is abutted and bonded to the raised part of the retainer to thereby integrally connect the sunroof glass, the retainer, and the weather strip together.

3. A sunroof assembly according to claim 1; wherein the holder part of the retainer extends generally perpendicular to the stopper part of the retainer.

4. A sunroof assembly according to claim 2; wherein the raised part of the retainer has a base portion, and the flange part extends generally perpendicular to said base portion.

5. A sunroof assembly comprising:
- a transparent member having first and second peripheral edge portions;
- a first supporting member connected to the first peripheral edge portion of the transparent member, the first supporting member having a first ridge portion defining a supporting edge disposed on the first peripheral edge portion, a second ridge portion, and a groove disposed between the first and second ridge portions; and
- a second supporting member connected to the second peripheral edge portion of the transparent member, the second supporting member having a recessed portion, a first flange portion extending generally perpendicular to the recessed portion, and a second flange portion disposed in the groove of the first supporting member and extending generally perpendicular to the first flange portion.

6. A sunroof assembly according to claim 5; further comprising means for anchoring the second flange portion of the second supporting member in the groove of the first supporting member.

7. A sunroof assembly according to claim 6; wherein the anchoring means comprises at least one projection disposed on the second flange portion of the second supporting member, and a notch disposed in the groove of the first supporting member for receiving the projection.

8. A sunroof assembly according to claim 6; wherein the anchoring means comprises a plurality of projections disposed on the second flange portion of the second supporting member and spaced at preselected intervals, and a notch disposed in the groove of the first supporting member for receiving the projections.

9. A sunroof assembly according to claim 5; further comprising an adhesive agent disposed in the recessed portion of the second supporting member for securing the transparent member to the second supporting member.

10. A sunroof assembly according to claim 5; wherein the first flange portion of the second supporting member is in abutment with the second ridge portion of the first supporting member.

11. A sunroof assembly according to claim 5; wherein the recessed portion of the second supporting member comprises a pair of sidewalls and a base disposed between the sidewalls; and wherein the first flange portion of the second supporting member extends generally perpendicular to the base of the recessed portion of the first supporting member.

12. A sunroof assembly according to claim 5; further comprising means for anchoring the second flange portion of the second supporting member in the groove of the first supporting member, and an adhesive agent disposed in the recessed portion of the second supporting member for securing the transparent member to the second supporting member;
- wherein the first flange portion of the second supporting member is in abutment with the second ridge portion of the first supporting member.

13. A sunroof assembly comprising:
- a transparent member having first and second peripheral edge portions;
- a first supporting member connected to the first peripheral edge portion of the transparent member, the first supporting member having a supporting portion disposed on the first peripheral edge portion of the transparent member, a first ridge portion extending from the supporting portion, a second ridge portion extending from the supporting portion, and a groove disposed between the first and second ridge portions; and
- a second supporting member connected to the second peripheral edge portion of the transparent member, the second supporting member having a raised portion in abutment with the first ridge portion of the first supporting member and having a flange portion disposed in the groove of the first supporting member.

14. A sunroof assembly according to claim 13;
- wherein the flange portion of the second supporting member extends generally perpendicular to the raised portion of the second supporting member.

15. A sunroof assembly according to claim 13;
- wherein the second supporting member has a recessed portion; and further comprising an adhesive agent disposed in the recessed portion of the second supporting member for securing the transparent member to the second supporting member.

16. A sunroof assembly according to claim 15;
- wherein the recessed portion of the second supporting member has a pair of sidewalls and a base disposed between the sidewalls; and wherein the flange portion of the second supporting member extends generally perpendicular to the base of the recessed portion of the second supporting member.

17. A sunroof assembly according to claim 15;
- wherein the raised portion of the second supporting member is disposed between the flange portion and the recessed portion of the second supporting member.

18. A sunroof assembly according to claim 13;
- wherein the second supporting member comprises a cavity disposed between the raised portion and the flange portion of the second supporting member; and further comprising an adhesive agent disposed in the cavity of the second supporting member.

* * * * *